United States Patent [19]

Lee

[11] Patent Number: 5,191,578
[45] Date of Patent: Mar. 2, 1993

[54] PACKET PARALLEL INTERCONNECTION NETWORK
[75] Inventor: Kuo-Chu Lee, Franklin, N.J.
[73] Assignee: Bell Communications Research, Inc., Livingston, N.J.
[21] Appl. No.: 537,682
[22] Filed: Jun. 14, 1990
[51] Int. Cl.$^5$ ............................................. H04R 11/04
[52] U.S. Cl. ..................... 370/63; 370/85.6; 370/85.11; 370/59; 340/825.5
[58] Field of Search ............ 370/60, 61.1, 94.1, 370/108, 58.1, 94.2, 58.2, 85.11, 85.6, 85.4, 94.3, 85.1, 85.9, 59, 62, 63, 64, 67, 69.1, 58.3, 29, 30; 340/825.5, 825.51, 825.02

[56] References Cited

U.S. PATENT DOCUMENTS

| | | | |
|---|---|---|---|
| 4,584,678 | 4/1986 | Ozeki et al. | 370/94.1 |
| 4,623,996 | 11/1986 | McMillen | 370/60 |
| 4,809,260 | 2/1989 | Davidson et al. | 370/60 |
| 4,866,702 | 9/1989 | Shimizu et al. | 370/60 |
| 4,899,333 | 2/1990 | Roediger | 370/94.1 |
| 4,905,231 | 2/1990 | Leung et al. | 370/60 |
| 4,922,486 | 5/1990 | Lidinsky et al. | 370/60 |
| 4,942,574 | 7/1990 | Zelle | 370/85.6 |
| 4,958,341 | 9/1990 | Hemmady et al. | 370/60.1 |
| 4,977,582 | 12/1990 | Nichols et al. | 370/108 |
| 4,985,889 | 1/1991 | Frankish et al. | 370/94.1 |
| 4,991,171 | 2/1991 | Teraslinna et al. | 370/94.1 |
| 5,054,022 | 10/1991 | Van Steenbrugge | 370/85.11 |
| 5,107,493 | 4/1992 | Eng et al. | 370/94.1 |

Primary Examiner—Douglas W. Olms
Assistant Examiner—Dang Ton
Attorney, Agent, or Firm—Leonard Charles Suchyta; Loria J. Baskerville

[57] ABSTRACT

A packet parallel interconnection network for routing packets in parallel form comprises a three-dimensional space domain switch which interconnects a plurality of time domain switches in the form of multiple two level bus systems with separate data and control paths. The space domain switch comprises one control plane and a plurality of data switching planes such that the $i^{th}$ data switching plane routes the $i^{th}$ data slice of a packet. The control plane and the data switching planes comprise output buffered crosspoint switches. The control plane processes address information in the packets to be routed and broadcasts routing information to the data switching planes to control the routing of data slices by the data switching planes. It is a significant advantage of the time and space domain switches that decoupled control and data paths provide for overlapped control processing and data routing. The inventive interconnection network is especially useful for implementing a parallel processing system for processing database queries.

27 Claims, 7 Drawing Sheets

CONTROL PLANE

PACKET PARALLEL INTERCONNECTION NETWORK

RELATED APPLICATION

An application entitled "High Performance Arbitration" filed for K. C. Lee on even date herewith, bearing Ser. No. 07/537,683 and assigned to the assignee hereof contains subject matter related to the subject matter of the present application. The contents of the related application are incorporated herein by reference.

FIELD OF THE INVENTION

The present invention relates to a centralized interconnection network for use in a parallel processing computer system, and more particularly, to a packet interconnection network for supporting dynamic database query processing in a general purpose parallel processing environment.

BACKGROUND OF THE INVENTION

Databases are one of the most complex and widely used applications of modern computer systems. Databases allow efficient sharing of large amounts of data among users and applications. Because the data are shared by many users, providing efficient access to the database requires concurrent processing of user queries. Depending on the type of application of the database, the spectrum of operations required to execute user queries may include statistical calculations on raw data, inferencing on rules, full text searches, and relational operations on tabulated records. As the size of a database is usually very large (gigabytes to hundred of gigabytes) concurrent query processing requires significant CPU and I/O time.

Presently many databases are resident in parallel processing computer systems and therefore queries executed on such databases are executed in parallel processing systems. A parallel processing system, typically comprises a plurality of processing nodes or processing sites interconnected by a interconnection network (see, e.g., C. L. Wu et al, "Tutorial: Interconnection Networks For Parallel and Distributed Processing", IEEE Computer Society Press, 1984).

A parallel processing system for dynamic query processing supports concurrent query processing through dynamic creation and coordination of tasks that operate on the shared data in a database. Tasks may comprise multiple smaller tasks accessing shared data concurrently. Tasks communicate with each other in a parallel processing system via message passing or shared memory referencing according to particular data dependency relationships.

The space and time complexity for each query is non-deterministic and the arrival rate of the queries is also unpredictable. A complex join operation may involve a large amount of data and take a long time to process; however, a simple selection operation may only involve a small amount of data and take little time to process. Because multiple queries from multiple users need to be processed concurrently, dynamic allocation of processing elements in a parallel processing system and scheduling of tasks and placement of data for each query make parallel query processing a complex problem.

An important characteristic of database applications is that queries are often data intensive rather than computation intensive. This means that the communication of data to appropriate processing nodes in a parallel processing system requires more resources than the actual processing of the data at the processing nodes. Accordingly, many frequently occurring data intensive operations such as file transfer, aggregation, projection, and process migration, require large bandwidth and low control overhead in the interconnection network of the parallel processing system to reduce communication costs. For this reason, the bandwidth of the interconnection network has a significant effect on the execution speed of more complex queries that require the sorting or joining of large relations.

In a dynamic environment, it is not possible to have a priori knowledge of data distributions and task execution times. Tasks are scheduled to run on dynamically allocated processing nodes and data also must be dynamically distributed among the processing nodes. Therefore, it is highly unlikely that the data associated with specific tasks are always uniformly distributed over the processors where the specific tasks are scheduled to run. Accordingly, data must be moved to the scheduled processors dynamically. These data movement operations are often bursty and occur in only some of the links in the network. Additionally, since data are often distributed non-uniformly over the domain of the attributes, non-uniform communication patterns can also occur during the data collection and load balancing phase of operations. Thus, in order to obtain a high speed-up factor for parallel execution, interconnection networks of parallel system not only need to have low average communication costs but also need to be robust to non-uniform traffic.

A qualitative analysis of the speed-up factor of parallel join algorithms achieved by a parallel processing system indicates that if a network cannot reduce communication costs for non-uniform traffic, the speed-up factor will be limited to only $\log n$, where n is the number of data items in the largest relation involved. The main reason for this limitation is that non-uniform communication traffic could be as large as n, when the data are to be distributed to or from one hot spot node. As a result, a typical data intensive operation which has $n \log n$ time complexity on a single processor, can only be improved by a factor of $\log n$ on arbitrary large number of processors if the communication time for load distribution reaches n. Therefore, the robustness to non-uniform traffic is a significant feature of an interconnection network that is designed for dynamic processing.

In view of the foregoing, an efficient interconnection network for a parallel processing system for processing database queries has the following characteristics:

1. The interconnection network should have a scalable architecture with high bandwidth, low latency and low blocking probability. In particular, a large system comprises thousands of nodes and requires terabits/sec switching capacity.
2. The interconnection network should offer sharing of bandwidth among tasks to reduce the communication delays and performance degradation resulting from bursty or other non-uniform traffic patterns. An interconnection network which dynamically shares bandwidth will exhibit smaller communication delays than a network with fixed end-to-end bandwidths. Illustratively, the interconnection network has a bursty transfer bandwidth on the order of one or more gigabytes per second.

3. The interconnection network should have a uniform topology, with equal bandwidth, latency and blocking probability between any given pair of nodes. In a large database system the software design is a significant portion of the total system cost. The uniform topology increases the portability of the software so that it ca be used in different nodes, therefor reducing software costs.
4. The interconnection network should offer prioritized communication services for multi-user, multi-tasking system support. Executing high priority tasks on multiple processing nodes without giving high priority to their corresponding communication operations may result in a high priority task being blocked by a low priority task in the interconnection network.

It is an object of the present invention to provide an interconnection network with the foregoing characteristics.

Presently available interconnection networks generally do not satisfy the foregoing requirements.

In particular, presently available interconnection networks have disadvantageous scaling characteristics. Unfortunately, communication time complexity is always traded for space complexity and blocking probability. Crosspoint switches (see, e.g., E. A. Arnould et al, "The Design of Nectar: A Network Backplane for Heterogeneous Multicomputers," ASPLOS-III Proceedings, The Third International Conference on Architecture Support for Programming Languages and Operating Systems, Boston, Mass., Apr. 3-6, 1989) provide non-blocking routing and simple control with time complexity $O(\log N)$ for selecting a crosspoint. However, the space complexity is $O(N^2)$, where N is the number of I/O nodes and $O(\ldots)$ indicates "on the order of." Other non-blocking multistage switches such as a Batcher-Banyan switch (see, e.g., A. Huang et al, "Starlite: A Wideband Digital Switch," Proceeding of Globecome 84, pp. 121-125; and C. Day et al, "Applications of Self-Routing Switches to LATA Fiber Optic Networks," International Switching Symposium, Phoenix, Ariz., March, 1987) and $2\log N$-1 stage networks (see, e.g., Tse-Yun Feng et al, "An $O((\log N)^2)$ Control Algorithm," Proceedings of Conf. on Parallel Processing, 1985, pp. 334-340) can have less than $O(N^2)$ space complexity, but the control of these networks takes on the order of $O((\log N)^2)$ time steps with $O(N(\log N)^2)$ switching nodes and $O((\log N)^2)$ time steps with N fully connected processors, respectfully (see, e.g., D. Nassimi et al, "A Self-Routing Bene Network and Parallel Permutation Algorithms," IEEE Transaction on Computers Vol. C-30, No. 5, May, 1981, pp. 332-340). The $\log N$ stage interconnection networks (see, e.g., W. Crowther et al, "Performance Measurements on a 128-node Butterfly Parallel Processor," in Proc. 1985 Int. Conf. Parallel Processing, August, 1985, pp. 531-540; G. F. Pfister et al, "The IBM Research Parallel Processor Prototype (RP3): Introduction and Architecture, In Proceedings of Int'l Conf. on Parallel Processing," pp. 764-771, 1985; A. G. Ranade, "How to Emulate Shared Memory," IEEE Symposium on Foundation of Computer Science, pp. 185-195, 1987) only require $O(\log N)$ time steps with $O(N\log N)$ switching nodes, but these networks are blocking, and to reduce the blocking probability and prevent starvation from blocked requests, buffers and arbitration circuits must be added to each switching node. This extra circuitry will increase the control complexity and the delay in the network when the size of the network is large.

As can be seen from the foregoing, available prior art interconnection networks do not have desirable scaling characteristics along with low latencies and low blocking probabilities. Accordingly, it is an object of the present invention to provide an interconnection network with desirable scaling characteristics, a low latency and a low blocking probability.

In addition, the available interconnection networks do not offer dynamic bandwidth sharing in a satisfactory manner. Space domain interconnection networks include the tree (see, e.g., DBC/1012 Data Base Computer "Concepts and Facilities", C02-0001-05 Release 3.2; and B. K. Hillyer et al, "Non-Von's Performance on Certain Data Base Benchmarks", IEEE Transactions on Software Engineering, Vol. 12, No. 4, April, 1986, 577-582) the mesh, the hypercube (see, e.g., W. C. Athas et al, "Multicomputers: Message-Passing Concurrent Computers," IEEE Computer August, pp. 9-24, 1988) and the above-described multistage interconnection networks. These space domain interconnection networks are not capable of allocating aggregate bandwidth dynamically to non-uniform and bursty traffic patterns. It is possible to have low utilization for some communication links and excessive queuing delays for others.

In contrast, time domain interconnection networks such as bus and local area networks can fully share the communications bandwidth among all the nodes. However, they are not scalable because of the limited bandwidth and increased latency for access control. In particular, parallel systems using time domain switches such as hierarchical buses and local area networks (see, e.g., D. R. Cheriton et al, "Multi-Level Shared Caching Techniques for Scalability in VMP-MC", ACM Symposium on Computer Architecture, 1989; E. Gehringer et al, "Parallel Processing The Cm* Experience," Digital Press, 1987; D. DeWitt et al, "GAMMA—A High Performance Dataflow Database Machine," Proc. of the VLDB Conf. Japan, August, 1986; J. Goodman et al, "The Wisconsin Multicube: A New Large-Scale Cache-Coherent Multiprocessor", IEEE International Symposium on Computer Architecture Conference, pp 422-431, 1988) can satisfy the bandwidth sharing and uniformity requirements. However, due to the bandwidth limitation and propagation delay caused by capacitive loads, the number of loads connected to these time domain switches is limited. To build larger systems, multiple buses need to be connected via different topologies such as a mesh, hyperbus, hierarchical bus, or multiple bus. However, the resulting interconnection networks are not sufficient for data intensive applications where large amounts of data are frequently moved between nodes for load balancing and data reorganization.

Thus, time domain switching is efficient for bandwidth sharing but is not scalable. To alleviate the scalability problem, in particular for data intensive applications, it is a further object of the present invention to provide a high bandwidth interconnection network capable of providing high bandwidth interconnections between multiple time domain switches.

In addition, presently available interconnection networks do not offer a uniform topology. For a parallel processing system with a non-uniform interconnection network, topology information such as distance of communication, channel bandwidth, and blocking probability is exposed to the software to allow efficient execution of tasks. The topology dependency will increase the complexity of the software algorithms and will further complicate portability problems.

For example, in a distributed network such as a mesh or hypercube, to support efficient processing of topology information for dynamic routing, a complex VLSI routing chip is required for each node. Since packets can be delivered via different routes, extra buffers and control logic are required for maintaining the order of delivery at the higher protocol layer. Furthermore, algorithms developed on these systems are often mapped directly to the network topology to improve efficiency; thus, portability, dynamic partition and assignment, and fault tolerance problems become very complex.

A simpler solution would be to utilize a centralized switch that has uniform bandwidth, latency, and blocking probability between any given pair of nodes such that the topology of the machine is transparent to the compilers, operating systems, and user programs. Furthermore, if the nodes that connect to the switch are grouped into bus connected clusters, then, in the case of a fault, only a simple renaming procedure is required to either replace or mask-off the faulty nodes within the cluster.

In short, it is an object of the invention to provide an interconnection network which overcomes the shortcomings of the prior art networks described above. More particularly, it is an object of the invention to provide an interconnection network which has advantageous scaling characteristics, bandwidth sharing, and uniformity. It is a further object to provide an interconnection network based on a time-space-time structure which has a terabit per sec total transport bandwidth, a gigabyte per second bursty access bandwidth, robustness to non-uniform traffic, and which supports multiple priority services.

SUMMARY OF THE INVENTION

The present invention is an interconnection network for interconnecting processing nodes to form a parallel processing system for executing database queries.

Illustratively, a parallel processing system is organized into a plurality of clusters. Each of the clusters comprises a plurality of processing nodes and a time domain switching system for routing data packets in parallel form to and from the processing nodes within each cluster. Illustratively, each cluster is organized into groups of processing nodes. The time domain switch for each cluster may then comprise a plurality of local bus systems with separate data and control paths for transmitting packets in parallel form to and from the processing nodes within each group. A cluster bus system with separate data and control paths interconnects the local bus systems within each cluster.

A unique and highly advantageous space domain switch interconnects the clusters and serves to route packets between clusters. The space domain switch comprises a plurality of data switching planes. Each of the data switching planes routes a slice of a packet from an input connected to one specific cluster to one or more outputs connected to one or more other specific clusters. Thus, the data switching planes cooperate to route a packet through the space domain switch in parallel form. The space domain switch also comprises a control plane for controlling the data switching planes in response to control information contained in the packets to be routed. Illustratively, both the control and data switching planes comprise output buffered cross-point networks formed using single VLSI chips. The VLSI chips may be arranged in a three-dimensional stack. The control plane and data switching planes are decoupled so that data routing and control (i.e. address) processing are carried out in an overlapping manner.

In short, the present invention is a time-space-time interconnection network for routing packets in parallel form. The interconnection network comprises a plurality of time domain switches, each comprising a two level bus system. The time domain switches are interconnected by a space domain switch comprising a plurality of data switching planes for routing slices of packets and a control plane for processing control information. Both the time domain and space domain switches have decoupled control processing and data routing elements so that control processing and data routing are carried out in an overlapping manner. The time domain switches are used to support bandwidth sharing and high access bandwidth for non-uniform traffic. The capacities of the time domain switches are maximized to reduce the complexity of the space domain switches. The space domain switch is used to scale up the time domain switches such that the entire interconnection network appears as a "virtual bus" to the user. This "virtual bus" architecture utilizes high degrees of both data and pipeline parallism in both the space and time domain switches.

In the inventive interconnection network, priority among packets belonging to different applications is arbitrated through the use of arbiters which control the access of packets to the local and cluster buses and which control the routing of packets through the space domain switch. In particular, a unique variable priority fast arbiter with sublinear time complexity is utilized. The fast arbiter is especially useful in the space domain switch in that it permits the control processing and data routing to be overlapped.

The inventive interconnection network and especially the inventive space domain switch have several significant advantages in comparison to prior art systems. In particular, as is shown below, the inventive interconnection network has advantageous scaling characteristics, the inventive network is uniform, the inventive network offers dynamic bandwidth sharing, and the inventive network has decoupled data routing and control processing.

DETAILED DESCRIPTION OF THE INVENTION

The detailed description of the invention is divided into a plurality of subsections. Subsection A presents an overview of the inventive interconnection network. Subsection B describes the time domain switches utilized in the inventive interconnection network. Subsection C describes the space domain switch utilized in the inventive interconnection network. Subsection D describes some advantages of the inventive interconnection network. Subsection E describes a fast arbiter used in the inventive interconnection network.

A. Overview of the Interconnection Network

Figure 1:
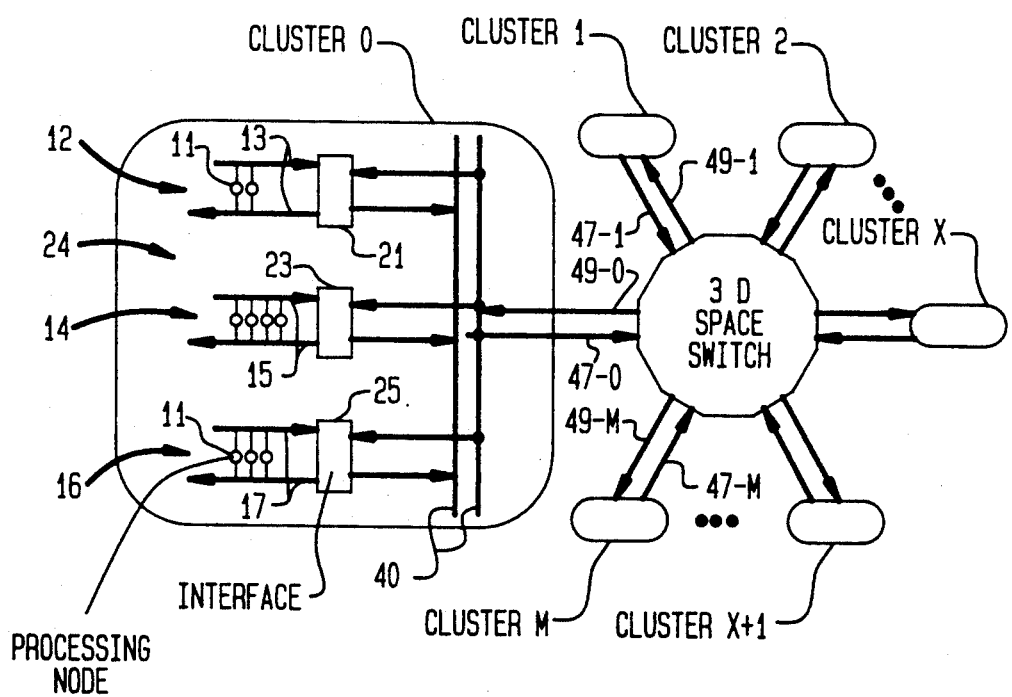
FIG. 1 schematically illustrates a packet parallel interconnection network in accordance with an illustrative embodiment of the present invention.

Turning to FIG. 1, an interconnection network 10 is illustrated. The network 10 serves to interconnect a plurality of individual processing nodes 11 to form a parallel processing system.

The processing nodes 11 are organized into clusters. In FIG. 1, the clusters are labeled cluster 0, cluster 1, cluster 2, ..., cluster x, cluster x+1, ..., cluster M. The clusters are interconnected by a three dimensional space domain switch 50 which is described in detail below in connection with FIGS. 3, 4, 5 and 6.

In FIG. 1, the cluster 0 is illustrated in detail. The cluster 0 comprises a plurality of local processor groups 12, 14, 16. Each of the local groups comprises a plurality of individual processing nodes 11. Within the local processor groups 12, 14, and 16, the individual processing nodes are connected by the local bus systems 13, 15, and 17, respectively. The local bus systems 13, 15, and 17 carry data packets upstream from the processing nodes towards a local/cluster bus interface 21, 23, and 25, respectively. The local bus systems 13, 15, 17 also carry packets downstream from the corresponding local/cluster bus interfaces 21, 23, and 25 towards the individual processing nodes. The local bus systems 13, 15, and 17 route packets in parallel form and have separate data and control paths. Access to each of the local bus systems 13, 15,, and 17 is controlled by an arbiter circuit (not shown in FIG. 1) described in detail below in connection with FIGS. 7A, 7B and 8.

Within each cluster such as the cluster 0 shown in detail in FIG. 1, the processor groups 12, 14, 16 are connected by a cluster bus system 40. The cluster bus system 40 receives data packets from and transmits data packets to the local/cluster bus interface units 21, 23 and 25. The cluster bus system 40 of each cluster also connects to the space domain switch 50 by interconnections 47-0, ..., 47-M, 49-0, ..., 49-M. Access to the cluster bus system 40 of the cluster 0 is controlled by an arbiter circuit (not shown in FIG. 1) described in detail below in connection with FIGS. 7A, 7B and 8. The local bus systems and the cluster bus system within each cluster together form a time domain or time division switch 24.

As shown in FIG. 1, the cluster bus system 40 of the cluster 0 is connected to the three dimensional space domain switch 50. A corresponding cluster bus from each of the clusters 0, 1, ..., M is also connected to the space domain switch 50. Thus, the three dimensional space domain switch 50 serves to interconnect the time domain switches formed by the two level bus system in each cluster.

B. Time Domain Switches

Figure 2:
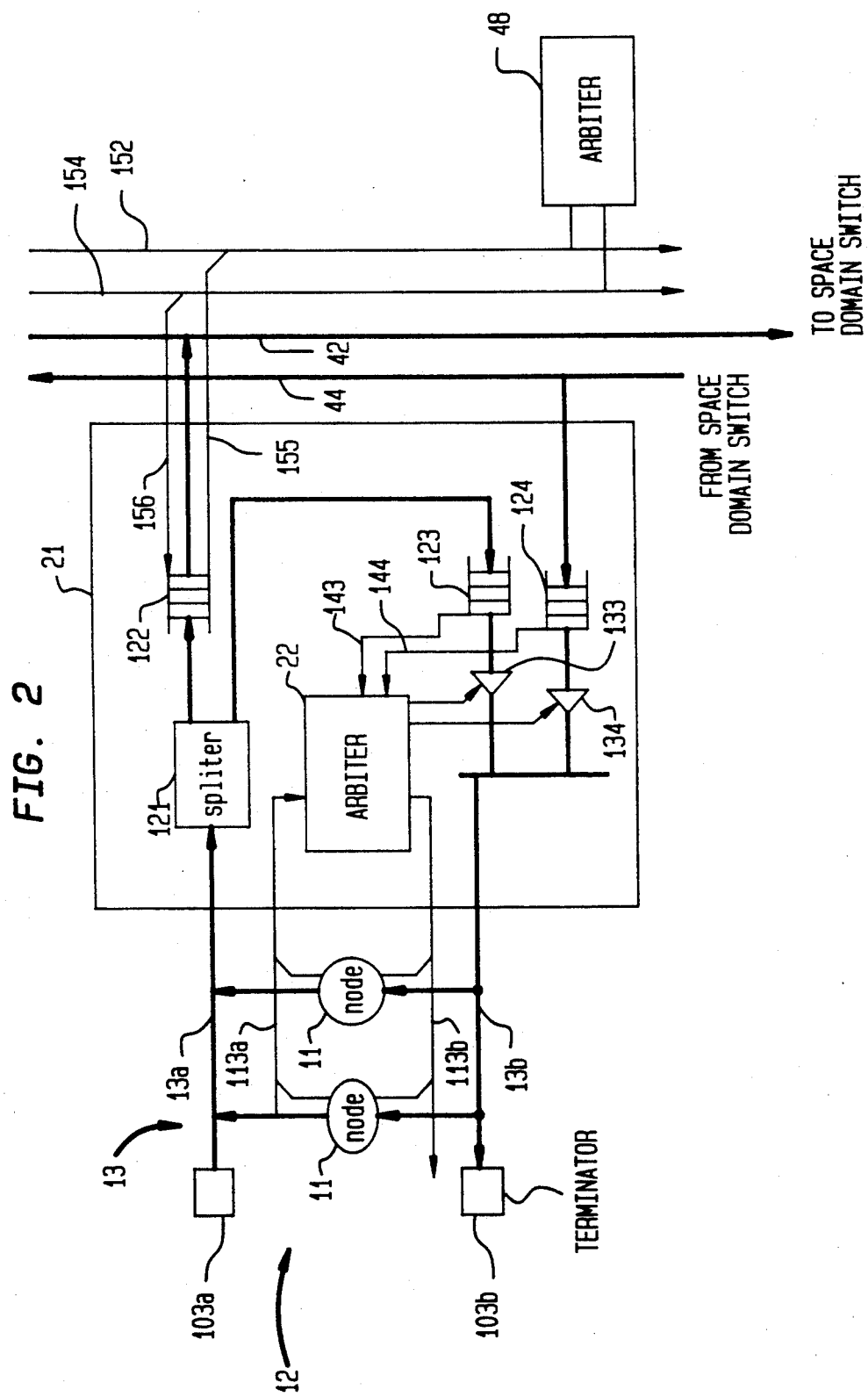
FIG. 2 illustrates a local/cluster bus interface for use in the packet switch of FIG. 1.

The structure of the local and cluster bus systems and the structure of the time domain switches formed in each cluster by the bus systems are shown in greater detail in FIG. 2.

More particularly, FIG. 2 shows a local group 12 of individual processing nodes 11. Illustratively, the group 12 comprises two individual processing nodes 11. The local bus system 13 which connects the processing nodes 11 comprises two unidirectional data buses 13a and 13b, a request bus 113a and a grant bus 113b. The local bus 13a transmits data, illustratively in the form of packets, upstream from the processing nodes 11 to the local/cluster bus interface 21. The local bus 13b transmits data packets downstream from the interface 21 to the individual nodes 11. The buses 13a and 13b transmit data packets in parallel form. These buses are terminated by the terminators 103a and 103b.

Access to the local unidirectional buses 13a, 13b by the individual processing nodes 11 is controlled by the arbiter 22 which forms part of the interface 21. More particularly, associated with the transmission bus 13a is a request bus 113a and a grant bus 113b. When a node 11 wants to achieve access to the data transmission bus 13a, it sends a request via the request bus 113a to the arbiter 22. The arbiter arbitrates among the requests for access to the bus 13a and transmits a grant indicator to the winning node 11 via the grant bus 113b. The winning node 11 then transmits a packet via the bus 13a to the interface 21. Because there are decoupled data paths 13a, 13b and control paths 113a, 113b, control processing and data routing can be overlapped.

If a packet transmitted via the bus 13a is destined for a node in another group or in another cluster, the packet is routed by the splitter 121 of the interface 21 to the buffer 122 where the packet then awaits access to the cluster bus system 40. Alternatively, if the packet is to be routed to another node 11 within the group 12, the packet is routed by the splitter 121 to the buffer 123.

In FIG. 2, the buffer 124 is used to receive packets from the cluster bus system 40 which are destined for the nodes 11 in the group 12.

The arbiter 22 also controls the access of the packets stored in the buffers 123, 124 to the data bus 13b. In particular, the arbiter 22 arbitrates among requests received via lines 143 and 144 from the buffers 123 and 124 and sends grant signals to the tristate devices 133 and 134 to permit packets from the buffers 123 and 124 to achieve access to the data bus 13b. Again, there are separate control and data paths so that control processing by the arbiter 22 and the transmission of request and grant signals can overlap with the transmission of data packets to the nodes 11 via the bus 13b.

As shown in FIG. 2, the cluster bus system 40 comprises the unidirectional data buses 42 and 44 for carrying packets in parallel form in opposite directions towards and away from the space domain switch 50, respectively.

The cluster bus system 40, in addition to including the unidirectional data buses 44 and 42, also includes the request bus 152 and the grant bus 154. In order for a buffer, such as the buffer 122, to gain access to the bus 42 to put a packet thereon, a request is transmitted via line 155 to the request bus 152. The cluster arbiter 48 receives requests via the request bus 152, arbitrates among competing requests for the bus 42 based on the request priorities, and transmits a grant signal via the grant bus 154 and the line 156. In response to the grant signal, the buffer 122 outputs a packet onto the bus 44 for transmission to the space domain switch. Thus, as in the local bus systems, in the cluster bus system 40, there are separate control and data paths so that control processing and data transmissions are overlapped.

In short, each of the clusters 0, 1, ..., M of FIG. 1 comprises a time domain switch for interconnecting individual processing nodes 11. Each time domain switch is formed by a bus system having two levels, the local bus level and the cluster bus level. There are separate control and data paths for each bus for overlapping control processing and data transmissions. Access to the busses is controlled by high speed arbiter circuits to be discussed below.

As shown in FIG. 1, each of the clusters $0, 1, \ldots, M$ is connected to the space domain switch 50 by an input interconnection 47-0, 47-1, ..., 47-M and an output interconnection 49-0, 49-1, ..., 49-M. The input and output interconnections transmit packets to and from the space domain switch 50 in parallel form as shown in FIG. 3.

C. Space Domain Switch

Figure 3:
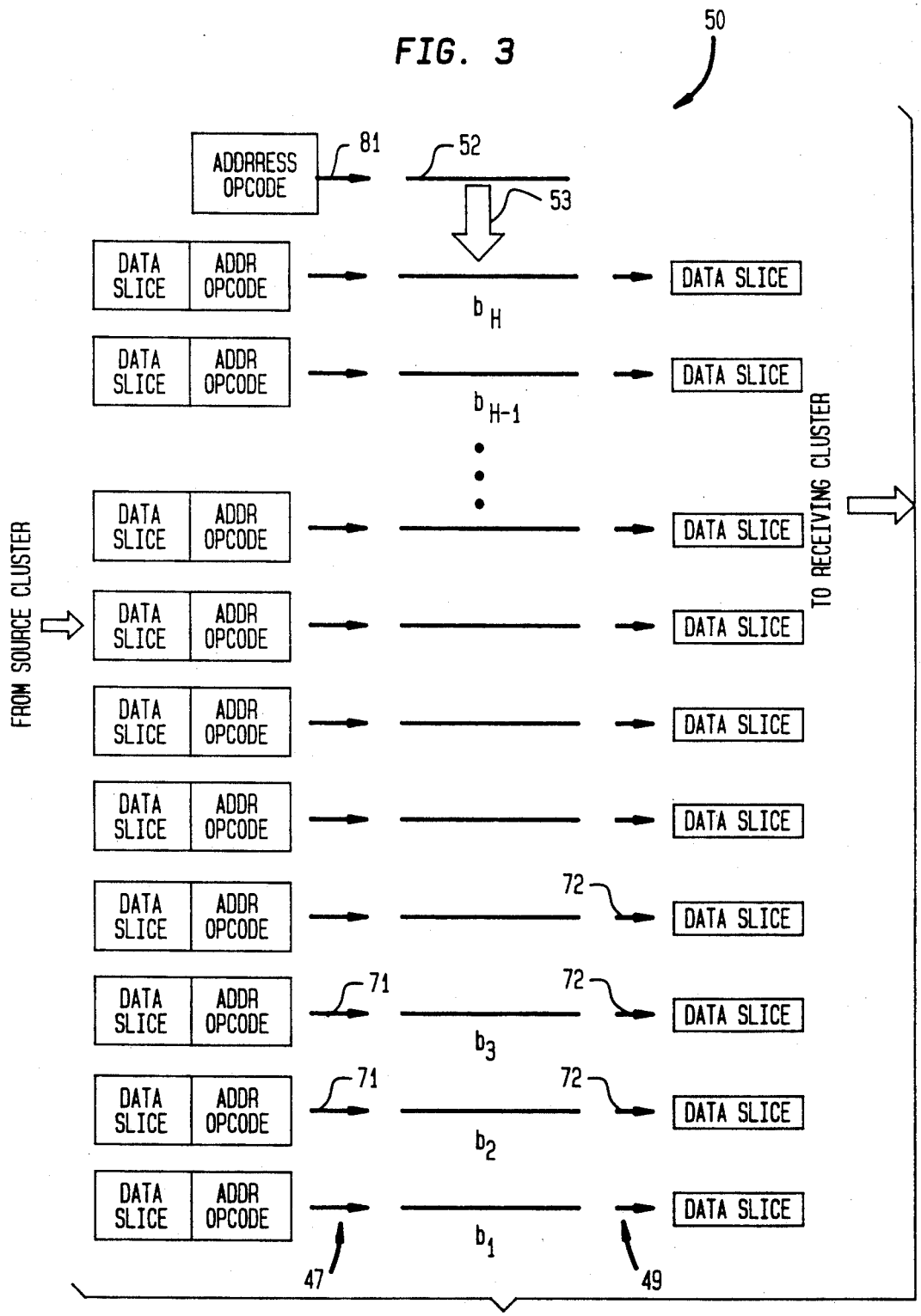
FIGS. 3 and 4 schematically illustrate a three-dimensional packet parallel space domain switch for use in the switch of FIG. 1.

The three dimensional space domain switch 50 is shown in greater detail in FIG. 3. The three dimensional switch 50 comprises a control plane 52 and H data switching planes labeled $b_1, b_2, \ldots, b_H$ in FIG. 3. Data packets to be routed arrive at the data planes $b_1, b_2, \ldots, b_H$ in parallel form from the clusters via the incoming interconnections 47. One such incoming packet transmitted from a specific cluster via a specific interconnection 47 is illustrated in FIG. 3.

As shown in FIG. 3, the interconnection 47 comprises a plurality of lines 71 leading to the data switching planes and a line 81 leading to the control plane 52. Each of the lines 71 transmits a data slice of the packet to be routed as well as address and opcode information to the data planes $b_1, b_2 \ldots, b_H$. Illustratively, each data slice may comprise one or more data bits of a packet. The address and opcode information is routed to the control plane 52 via line 81. Operating in parallel with the data switching planes, the control plane 52 processes the address and opcode information and broadcasts routing control information to the data switching planes via the channel 53 to determine how the data slices are routed by the data switching planes. As shown in FIG. 3, each data switching plane b routes its data slice to an output line 72 which forms a part of a specific outgoing cluster interconnection 49. In this manner, packets are routed in parallel form through the space domain switch 50 from one cluster to another.

Figure 4:
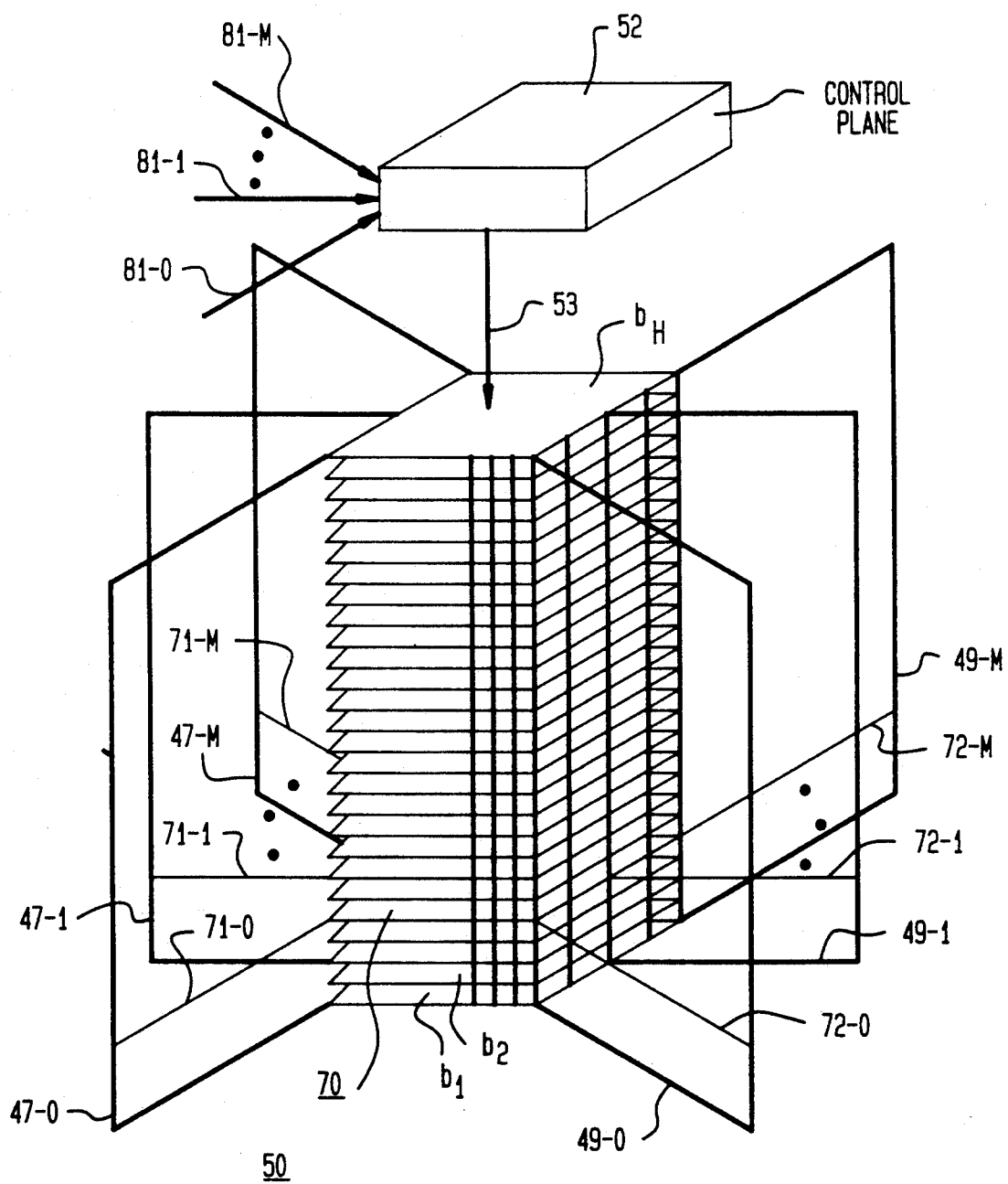

Preferably, the control plane 52 and the data switching planes $b_1, b_2, \ldots, b_H$ are formed from VLSI chips and organized into a three dimensional stack. Such a three dimensional stack 200 is shown in FIG. 4. The stack 200 of FIG. 4 comprises the control plan chip 52 and the data switching plane chips $b_1, b_2, \ldots, b_H$. Packets are transmitted to the stack 200 by the incoming interconnections 47-0, 47-1 ... 47-M which comprise the conductors 71-0, 71-1, ..., 71-M, etc. leading to the planes $b_1, b_2, \ldots, b_H$ and the conductors 81-0, 81-1, ... 81-M leading to the control plane 52. Packets are transmitted from the stack 200 via the outgoing interconnections 49-0, 49-1, ..., 49-M which comprise the conductors 72-0, 72-1 ... 72-M, etc. Packets are routed in parallel such that the $i^{th}$ data slice of an incoming packet is routed by the $i^{th}$ data switching plane under control of routing information broadcast via the channel 53 from the control plane 52.

Figure 5:
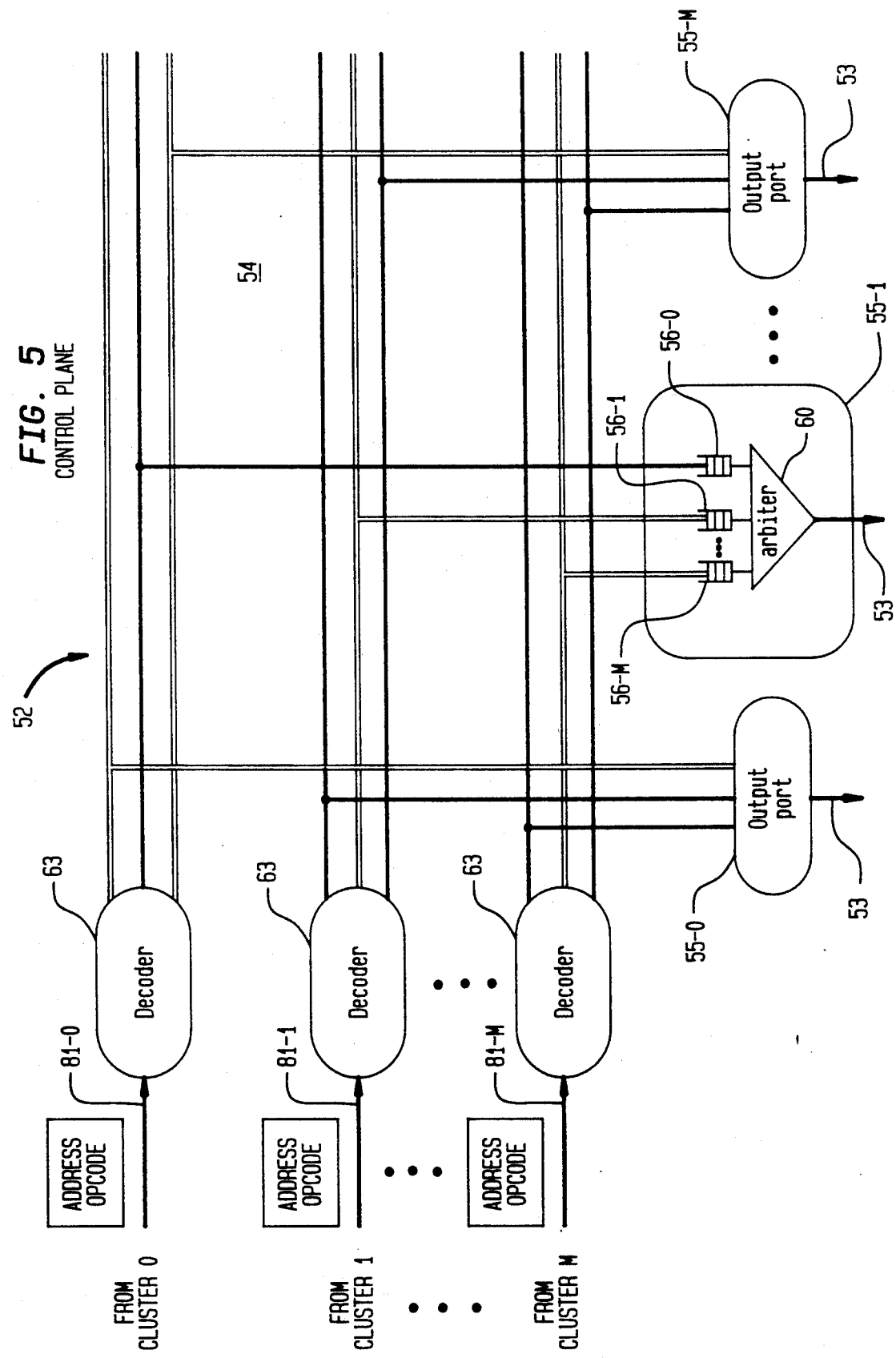
FIG. 5 illustrates a control processing plane for use in the space domain switch of FIGS. 3 and 4.

The control plane 52 is shown in greater detail in FIG. 5. The control plane 52 comprises the input lines 81-0, 81-1 ... 81-M which are connected to the clusters $0, 1, \ldots, M$, the decoders 63, the crosspoint network 54 and the output ports 55-0, 55-1, ..., 55-M. Each output port 55-0, 55-1, ..., 55-M contains a buffer 56-0, 56-1, ..., 56-M associated with each of the inputs 81-0, 81-1, ..., 81-M As is explained below, each output 55-0, ..., 55-M controls the access of data switched by the space domain switch 50 to a corresponding cluster $0, \ldots, M$.

Requests for specific output ports 55-0, 55-1 ... 55-M (i.e. requests for access to specific clusters $0, 1, \ldots, M$) in the form of address and opcode information arrive at the control plane 52 via the inputs 81-0, 81-1, ..., 81-M and are decoded by the associated decoders 63. The requests are then routed by the crosspoint network 54 to the appropriate buffers in the requested output ports 55-0, 55-1, ..., 55-M. Depending on whether a packet to be routed is a point-to-point, broadcast or multicast packet as indicated by the opcode, a request will be routed to one or more output ports 55 corresponding to one or more requested clusters.

Thus, the requests for each cluster $0, 1, \ldots, M$ are stored in the buffers of the corresponding output ports 55-0, 55-1 ... 55-M. An arbiter 60 at each output port 55 decides on a winning request for each cycle of the space domain switch depending on the priorities of the buffered requests. Information indicating the winning requests is transmitted from the output ports 55 to the data switching planes $b_1, \ldots, b_H$ via the channel 53. The arbiter 60 is described in detail below in connection with FIGS. 7A, 7B and 8. However, at this point it should be noted that it is a significant advantage of the space domain switch 50 that the control plane and data switching planes operate in parallel. To accomplish this the arbiter 60 is preferably very fast.

Figure 6:
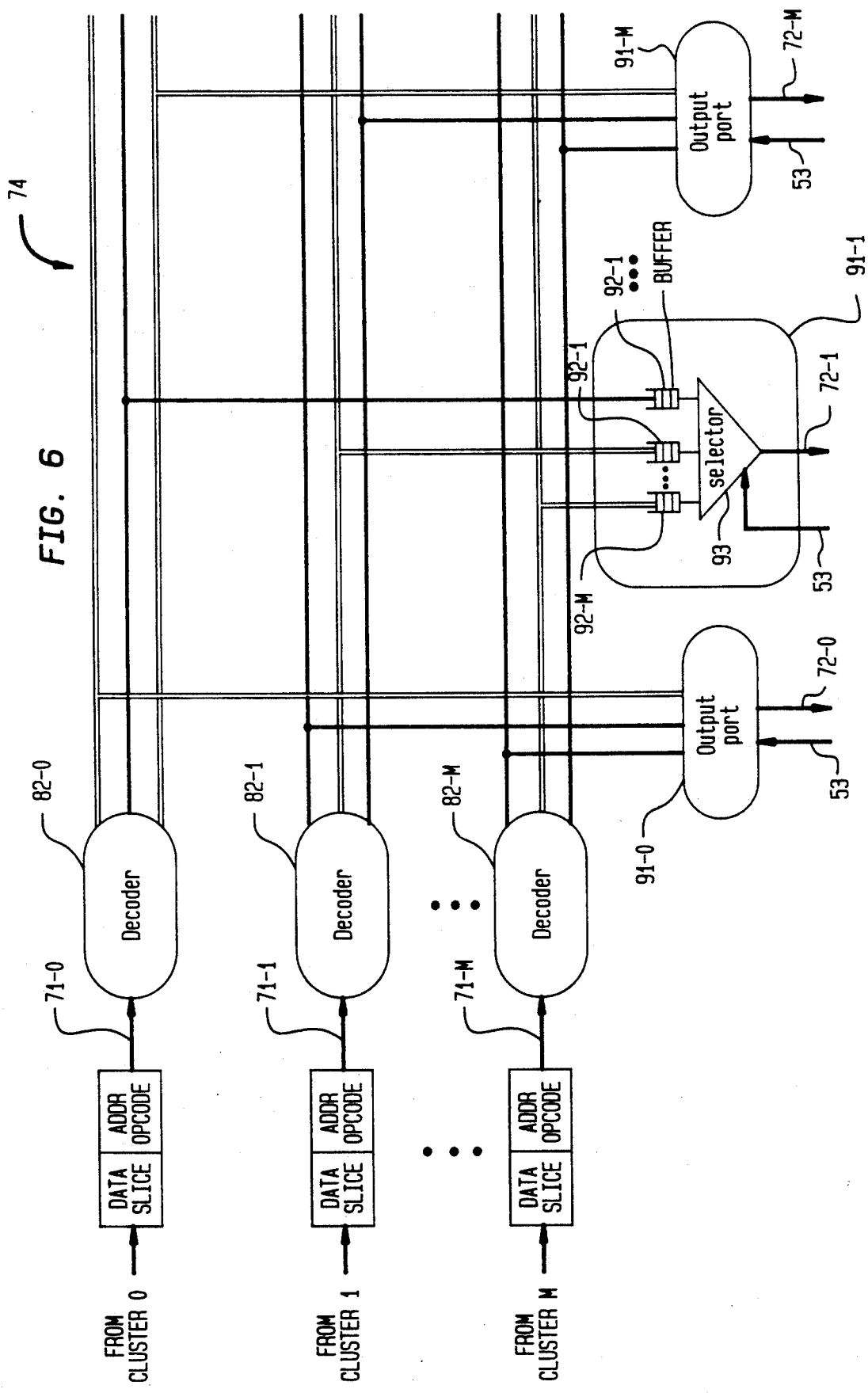
FIG. 6 illustrates a data switching plane for use in the space domain switch of FIGS. 3 and 4.

A data switching plane b is shown in FIG. 6. Like the control plane, the data switching plane of FIG. 6 operates as an output buffered crosspoint network.

The data switching plane of FIG. 6 comprises the inputs 71-0, 71-1, ..., 71-M which form part of the interconnections 47-0, 47-1, ..., 47-M connected to the clusters $0, 1, \ldots, M$ (see FIG. 1 and FIG. 4). The data switching plane of FIG. 6 also comprises the input decoders 82-0, 82-1, ..., 83-M, the crosspoint network 74 and the output ports 91-0, 91-1, ..., 91-M. Each output port is connected to a line 72-0, 72-1, ..., 71-M which forms part of an outgoing interconnection 49-0, 49-1 ... 49-M (see FIG. 1 and FIG. 4) connected to a cluster $0, 1, \ldots, M$.

As shown in FIG. 6, data slices from different packets to be routed arrive via the inputs 71-0, 71-1, ..., 71-M from different ones of the clusters $0, 1, \ldots, M$, respectively. Each data slice which is to be routed by the data switching plane of FIG. 6 is precede by address and opcode information. The address and opcode information preceding the data slices is decoded by the decoders 82-0, 82-1, ..., 82-M.

Each data slice is routed by the crosspoint network 74 to the one or more output ports 91 indicated by the address and opcod information associated therewith. Depending on whether the data slice belongs to a point-to-point, multicast or broadcast packet, the data slice is routed to one or several output ports 91.

Each output port such as the output port 91-1 includes a buffer 92-0, 92-1, ..., 92-M corresponding to each input 71-0, 71-1, ..., 71-M. Each buffer 92 stores data slices received from the corresponding input 71. Access to the associated output 72 such as the output 72-1 is controlled by the selector 93 in each output port 91. In response to information received from the control plane 52 via channel 53, the selector 93 in each output port 91 controls the access of the data slices in the buffers 92 to the outputs 72.

It is an important feature of the space domain switch 50 that address and opcode processing by the control plane 52 and the arbitration decisions made therein overlap with the routing of data slices by the data switching planes. This results in maximal utilization of the control resources.

D. Advantages of the Interconnection Network

The inventive interconnection network and especially the inventive space domain switch have several significant advantages in comparison with prior art systems.

First, the highly parallel data path of the inventive interconnection network significantly reduces the VLSI hardware complexity of the space domain switch. Assume that the packet size is L, and the data path width of the space domain switch is H, where $1 \leq H \leq L$. Then, to achieve the same throughput as in an $N \times N$ bit serial space division switch, the present invention utilizes only a $N/H \times N/H$ switch with an H bit wide data path (i.e., H data switching planes). The space complexity of a space domain switch is at least worse than linear, i.e. $O(N(\log N)^2)$ for a Batcher-Banyan switch and $O(N^2)$ for a crosspoint switch and a knock-out switch (see, e.g., Y. S. Yeh et al, "The Knockout Switch: A Simple, Modular Architecture for High-Performance Packet Switching," IEEE Journal on Selected Areas in Communications, Vol. SAC-5, No. 8, October, 1987). Thus, the reduction in size of the space domain switch achieved by the invention is more significant than the linearly increasing number of data switching planes. For example, a bit serial $N \times N$ Batcher-Banyan switch with a complexity of $O(N(\log N)^2)$ and an $N \times N$ crosspoint switch with a complexity of $O(N^2)$, can be reduced in accordance with the present invention to $M = N/H$ time domain switches and one space domain switch with complexity $O(N(\log(N/H))^2)$ and $O(N^2/H)$, respectively. Since the time domain switch only requires a simple arbiter for each bus, its cost is small compared to the complex and expensive processing nodes attached to it. The significant reduction in hardware complexity allows the design of a more complex but more powerful output buffered crosspoint network for each plane in the space domain switch to achieve a low control and routing delay and a very low blocking probability.

The optimal value of H depends on the particular technology used in a given implementation. For a given technology, H is bounded by the switching bandwidth and the packet size. Since each node requires H drivers, the space complexity of the time domain switches is O(NH), where H is equal to the width of the datapath. As indicated above, the space complexity of the space domain switch is $O(N^2/H)$. The total complexity of the time-space-time interconnection network is about $O(N(H+N/H))$. Since an optimal H is about $\sqrt{N}$, the total complexity of the interconnection network is $O(N\sqrt{N})$ which is much smaller than $O(N^2)$. However, since choosing a large H will result in more access bandwidth, more bandwidth sharing, and a lower cost space domain switch, it is advantageous to maximize the value of H.

Thus, the inventive interconnection network has a highly advantageous scaling.

Network uniformity for all applications and software portability are also significant advantages of the inventive interconnection network. Each communication request within a particular priority class is given the same amount of bandwidth and blocking probability. The amount of inter-chip communication is also uniform for all nodes. In conjunction with a large and sharable bandwidth, the uniformity characteristic makes the inventive interconnection network appear as a large virtual bus to the software. It is, therefore, not necessary to optimize the communication distance as any node can talk to any other node equally well.

An important characteristic of the inventive interconnection network is the dynamic time sharing of a large communication bandwidth. The interconnection network has a bandwidth which exceeds the maximum fan-out and fan-in capability of any accessing node and provides a uniform and simple routing and broadcasting time complexity between any pair of nodes. Therefore, as indicated above, within a maximum access bandwidth limit, the inventive interconnection network appears like a single (virtual) bus to the accessing nodes. Thus, the inventive interconnection network has an advantageous queuing behavior. In addition, the inventive network offers the uniformity of a bus with respect to distance, blocking probability and bandwidth, so as to simplify the scheduling and resource allocation operations needed for network management software.

A further fundamental difference between the inventive interconnection network and existing self-routing switches is that the inventive interconnection network has decoupled control and data paths for each packet to allow overlapped address processing and routing. Decoupling the control and routing can reduce the hardware resources required for packet address processing by allowing the address processing time to be overlapped with the data routing time. For example, to switch 32 typical packets, where each has 10 address bits and 1000 data bits, the address processing time for a bit serial self-routing switch is only 1% of the total routing time. However, with decoupled control and routing, the remaining 99% of the time can also be used for address processing. To perform the same task (process 32 packet headers), the bit serial self-routing switch will require 33 times more hardware resources compared to the inventive network which utilizes decoupled data routing and address processing. Thus, the inventive interconnection network achieves far better utilization of control resources than prior art networks.

The foregoing advantages make the inventive packet parallel interconnection network especially useful for implementing a parallel processing system for executing database queries.

E. Fast Arbiter

An arbiter having a tree structure may be used to implement the arbiter 22 of the local bus (FIG. 2), the arbiter 48 of the cluster bus (FIG. 2) and the arbiter 60 of the control plane circuit (FIG. 5). The tree structured arbiter has the significant advantage that it can handle multiple priority arbitrations and the advantage of having a sublinear time complexity, i.e., the time for an arbitration goes up with the log of the number of inputs N rather than linearly with the number of inputs as in the case of conventional arbiters. The tree structure arbiter is described below in connection with FIGS. 7A, 7B and 8.

Figure 7A:
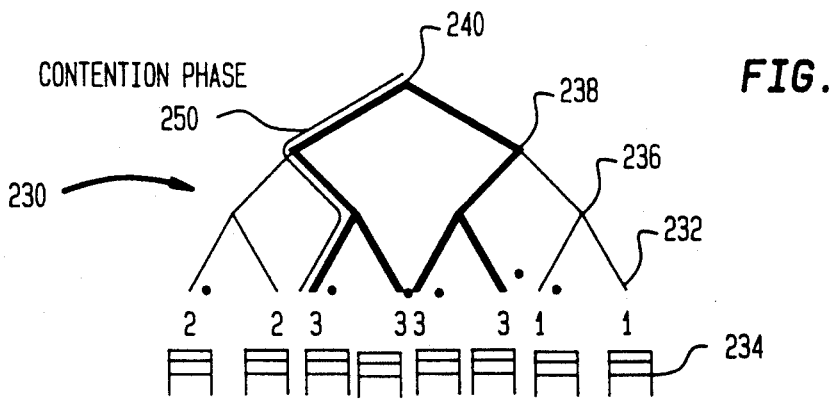
FIGS. 7A, 7B and 8 illustrate an arbiter for use in the control plane of FIG. 3 and in the bus interface of FIG. 2.

The arbiter 230 of FIG. 7A has a tree structure formed from the leaf nodes 232 and non-leaf nodes, e.g., 236, 238, 240. Each non-leaf node is connected to two child nodes below it in the tree and to one parent node at a higher level in the tree. The uppermost node in the tree is the root node 240. The leaf nodes 232 of the tree arbiter 230 are each associated with a queue or buffer 234 which contains requests. In general, the tree arbiter 230 has N leaf nodes 232 and the requests can belong to F priority classes. In the example of FIG. 7A, P=3 so that the priority classes 1, 2, and 3 are utilized, with class 3 having the highest priority. Each queue 234 has a number associated with it which indicates the priority class of the requests stored therein. The arbiter 230 serves to control the access of the requests stored in the queues 234 to a resource (e.g. a bus or multiplexer) associated with the root node 240 of the tree arbiter 230.

In an arbitration cycle, the arbiter takes N input requests as contenders (i.e. one from each input queue 234) and selects only one winner. The winner is deleted from its queue and a new contender from the winner's queue is considered in the next arbitration cycle.

Figure 7B:
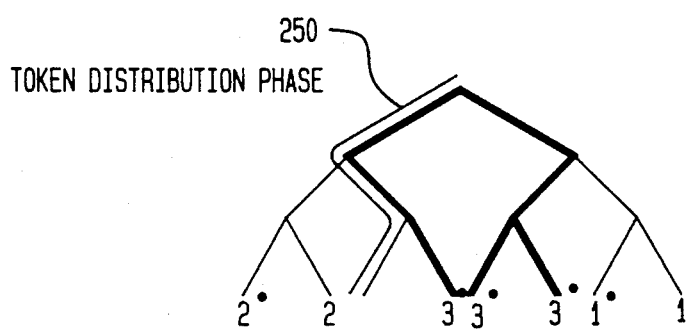

Each arbitration cycle is divided into a contention resolution phase and a token redistribution phase. The contention resolution phase is illustrated in FIG. 7A and the token redistribution phase is illustrated in FIG. 7B. During the contention resolution phase, each non-leaf node of the tree 230 (e.g. nodes 236, 238, 240) executes a contention resolution algorithm so that a single winner is ultimately determined at the root node 240. The token redistribution phase is utilized to implement a round-robin scheduling policy at the leaf nodes. In particular, in an arbitration cycle, after a winner is selected, token bits are redistributed among the leaf nodes to insure that the winning leaf node is not serviced again until the other leaf nodes belonging to the same priority class have been serviced.

Roughly speaking, the contention resolution phase operates as follows. Each non-leaf node serves as a comparator which compares the priorities of two requests received from the two child nodes below it in the tree. Of the two requests received at each non-leaf node, the request of the higher priority wins, and if the two priorities are equal, the request on the left wins. The priority of a request is determined by both its priority class and its token bit. More particularly, associated with each request is a token bit which may be clear or set. Within a particular priority class, a request with a clear token bit has a lower priority than a request with a set token bit. In FIG. 7A, the set token bits are indicated by "dots" adjacent the corresponding leaf nodes and clear token bits are indicated by the absence of such dots. Note that in FIG. 7A, all requests of the highest priority class (i.e. class 3) have set token bits. Thus, in FIG. 7A, the winning request follows the path 250 to the root node 240 of the tree arbiter 230. During the token redistribution phase, tokens are distributed to the leaf nodes to insure that the winning leaf node (i.e. the third leaf node from the left) has a lower priority than the other leaf nodes of the same priority class until the other leaf nodes of the same priority class are served, thereby implementing a round-robin scheduling policy. Thus, as shown in FIG. 7B, the token bits have been redistributed so that the winning leaf node in the contention resolution phase now has a clear token bit and thus a lower priority than other leaf nodes in the highest priority class.

The arbitration cycle may be understood in more detail as follows. A contention tree is a subtree that connects leaf nodes of equal priority value. A winner's contention tree, identified herein as "Ctree" is a subtree which connects the leaf nodes of the highest priority class (e.g. in FIG. 7A, priority class 3) to the root node of the tree. In FIG. 7A, the Ctree is identified in bold print. A grant trace of an arbitration cycle is a path from the root to the winning leaf node. Thus, in FIG. 7A, the grant trace is the path 250. A "Left Ctree" is the portion of the Ctree including the grant trace and to the left of the grant trace. A "Right Ctree" is the portion of the Ctree to the right of the grant trace.

Figure 8:
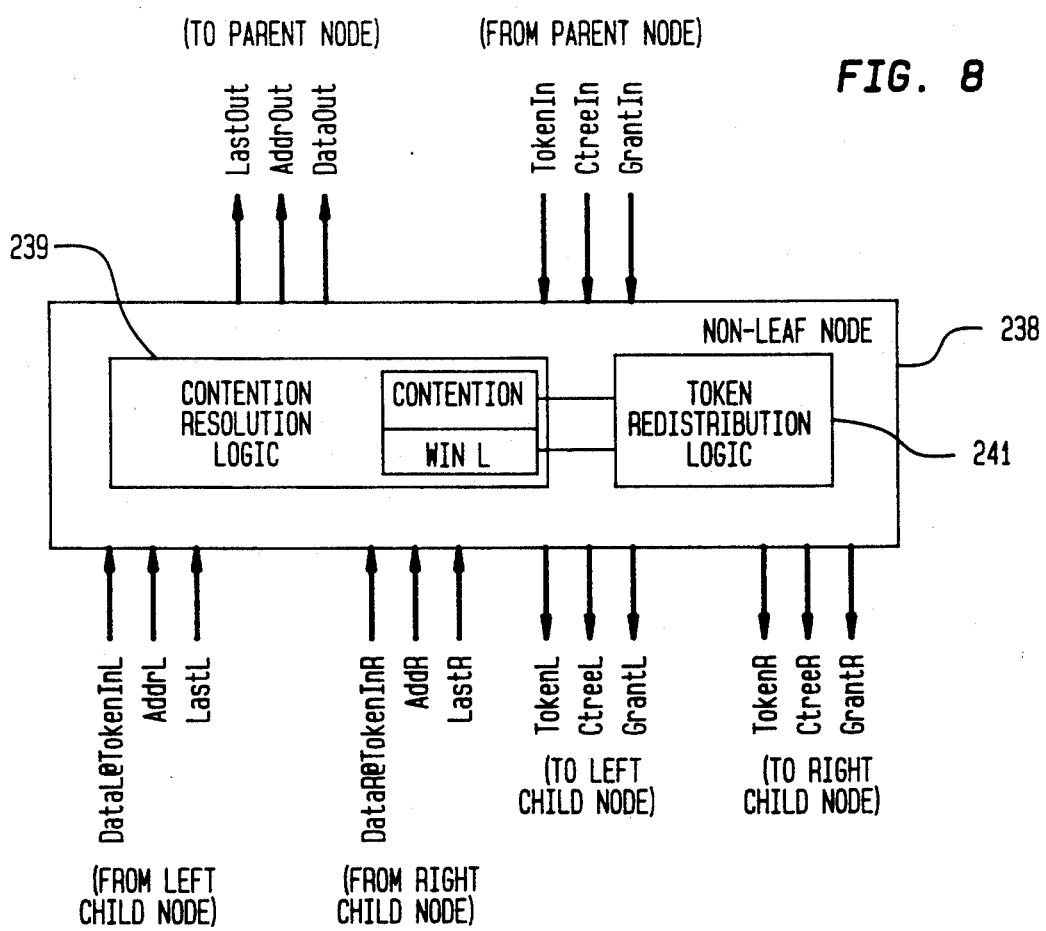

In the contention resolution phase of an arbitration cycle, each non-leaf node records the state of the contention and the position of the winner in "Contention" and "WinL" bits (see FIG. 8). The contention bit is set if the two input requests to a node have the same priority and WinL is set when the priority level from the left input is greater than or equal to the priority level from the right input.

After the winner is determined (e.g. in FIG. 7A the third leaf from the left), the token redistribution phase begins. In this phase, token bits of the leafs in the Left Ctree will be cleared and the token bits in the Right Ctree will be set to one to carry out the round-robin scheduling policy. In the example of FIG. 7A, the leaf nodes corresponding to the priority 1 and priority 2 requests do not contain the winner and thus are not affected by the token redistribution phase. The redistribution of token bits with clear token bits being distributed to the leaf nodes in the Left Ctree and set token bits being distributed to the leaf nodes in the Right Ctree is shown in FIG. 7B. Once the token bit of the winning leaf node is cleared, a new request from the queue associated with the winning leaf can join the next arbitration cycle. However, this new request will have a lower priority than a request from the same priority class at a leaf node that has a set token bit. Therefore in the example of FIG. 7A and FIG. 7B, the request to the right of the previously granted leaf node (i.e. the fourth leaf node from the left) will win the next arbitration cycle. After the last leaf of the highest priority class (in this case, priority level 3) has been victorious in the contention resolution process of an arbitration cycle, the token bits of the leaves in the left Ctree will all be set to one to restart the next arbitration. Thus, a round-robin scheduling policy is emulated within the Ctree from left to right. The token redistribution logic may be summarized as follows:

If the last leaf node in the Ctree is the winner then
    set the token bits at the leaf nodes on the Left Ctree
    clear the token bits at the leaf nodes of the Right Ctree
else
    clear the token bits at the leaf nodes in the Left Ctree
    set the token bits at the leaf nodes in the Right Ctree The algorithms executed by the non-leaf nodes of the tree arbiter are now considered in more detail. FIG. 8 schematically illustrates a non-leaf node 238. The non-leaf node 238 executes a contention resolution algorithm using contention resolution logic 239 during the contention resolution phase of an arbitration cycle and a token redistribution algorithm using token redistribution logic 241 during a token redistribution phase of an arbitration cycle. The contention resolution algorithm sets or clears two bits stored in the non-leaf node 238. These bits are WinL and Contention as schematically illustrated in FIG. 8. The outputs of the contention resolution algorithm which are generated in the node 238 and propagated up the tree to the parent node are AddrOut (i.e. the address of the winning request), DataOut (i.e. the priority level and token value of the winning request), and LastOut (i.e. an indication that there is a contender to the right of the current winner). The input signals for the contention resolution algorithm are LastL and LastR (i.e. the LastOut signals from the left and right lower level child nodes connected to the node 238). AddrR and AddrL (i.e .the leaf addresses of the requests from the left and right lower level child nodes), TokenInL and TokenInR (i.e. the token values associated with the requests from the left and right child nodes) and DataL and DataR (i.e. the priority classes of the requests from the left and right lower level child nodes).

The following algorithm is executed at the node 238 by the contention resolution logic 239 during the contention resolution phase of an arbitration cycle:

$$\text{WinL} = \text{ge}(\text{DataL}@\text{TokenInL}, \text{DataR}@\text{TokenInR})$$
$$\text{Contention} = \text{equ}(\text{DataL}, \text{DataR})$$
$$\text{LastOut} = (\text{Contention} \quad \text{LastL} \quad \text{WinL}) \quad (\text{LastR} \quad \text{WinL})$$

$$\text{AddrOut} = \begin{array}{l} \text{AddrL, if WinL} = 1 \\ \text{or} \\ \text{AddrR, if WinL} = 0 \end{array}$$

$$\text{DataOut} = \begin{array}{l} \text{DataL}@\text{TokenInL, if WinL} = 1 \\ \text{or} \\ \text{DataR}@\text{TokenInR, if WinL} = 0 \end{array}$$

It should be noted that X@Y means that the binary representation of Y is concatenated to the binary representation of X, equ(x, y) means the evaluation is true if x is equal to y, and ge(x y) means the evaluation is true if x is greater than or equal to y. According to these definitions, priority 1 is the lowest priority class.

As shown in FIG. 8, in the token redistribution phase, the node 238 receives the signals TokenIn, CtreeIn, and GrantIn from its parent node in the tree arbiter. As a result of executing a token redistribution algorithm by the token redistribution logic 241, the node 238 transmits TokenL, CtreeL, and GrantL signals to the left child node and the TokenR, CtreeR and GrantR signals to the right child node. The token distribution algorithm is as follows.

$$\text{TokenL} = \text{TokenIn}$$
$$\text{TokenR} = (\text{Contention} \quad \text{GrantIn} \quad \text{WinL}) \oplus \text{TokenIn}$$
$$\text{CtreeL} = \text{CtreeIn} \quad (\text{Contention} \quad \text{WinL})$$
$$\text{CtreeR} = \text{CtreeIn} \quad (\text{Contention} \quad \text{WinL})$$
$$\text{GrantL} = \text{GrantIn} \quad \text{WinL}$$
$$\text{GrantR} = \text{GrantIn} \quad \text{WinL}$$

At the root node, the TokenIn signal is connected to the LastOut signal and both GrantIn and CtreeIn are asserted. As indicated previously, the LastOut signal for each node indicates whether there is a contender to the right of the current winner. If the current winner at the root node originates from the rightmost leaf node in its priority class, LastOut is asserted and the TokenIn signal of the root is also asserted. The token bits in the leaf nodes are set or cleared by gating the TokenIn signal with CtreeIn in a manner such that only the token bits of the leaves of the highest priority class are updated.

From the contention resolution and token distribution algorithms, it is possible to estimate the arbitration latency. An N=32 input arbiter requires log N=5 levels of arbitration (i.e. non-leaf) nodes. Since the propagation delay of each arbitration node for P priority levels is on the order of loglogP for a logP bit comparator, the total propagation delay of the N input arbiter with P priority classes is on the order of (loglogP)(logN).

CONCLUSION

In summary, an inventive interconnection network for interconnecting processing nodes to form a parallel processing system for executing database queries has been disclosed.

In accordance with the invention, a parallel processing system is organized into a plurality of clusters. Each of the clusters comprises a plurality of processing nodes and a time domain switching system for routing data packets in parallel form to and from the processing nodes within each cluster. Illustratively, each cluster is organized into groups of processing nodes. The time domain switch for each cluster ma then comprise a plurality of local bus systems with separate data and control paths for transmitting packets in parallel form to and from the processing nodes within each group and a cluster bus system with separate data and control paths for interconnecting the local bus systems within each cluster.

A unique and highly advantageous space domain switch interconnects the clusters and serves to route packets between clusters. The space domain switch comprises a plurality of data switching planes. Each of the data switching planes routes a slice of a packet from an input connected to one specific cluster to one or more outputs connected to one or more other specific clusters. Thus, the data switching planes cooperate to route a packet through the space domain switch in parallel form. The space domain switch also comprises a control plane for controlling the data switching planes in response to control information contained in the packets to be routed. Illustratively, both the control and data switching planes comprise output buffered crosspoint networks formed using single VLSI chips. The VLSI chips may be arranged in a three-dimensional stack.

Thus, the present invention is a time-space-time interconnection network for routing packets in parallel form. The interconnection network comprises a plurality of time domain switches, each comprising a two level bus system. The time domain switches are interconnected by a space domain switch comprising a plurality of data switching planes for routing slices of packets and a control plane for processing control information. Both the time domain and space domain switches have decoupled control processing and data routing elements so that control processing and data routing are carried out in an overlapping manner.

In the inventive interconnection network, priority among packets belonging to different applications is arbitrated through the use of arbiters which control the access of packets to the local and cluster buses an which control the routing of packets through the space domain switch. In particular, a unique variable priority fast arbiter with sublinear time complexity is utilized. The fast arbiter is especially useful in the space domain switch in that it permits the control processing and data routing to be overlapped.

The inventive interconnection network has several significant advantages. These are:
1. a scalable architecture with low latency and low blocking probability;
2. the ability to share bandwidth uniformly;

3. a topology which provides for uniform communication capability between all pairs of nodes to promote software portability; and
4. the ability to support prioritized communication services.

Finally, the above-described embodiments of the invention are intended to be illustrative only. Numerous alternative embodiments may be devised by those skilled in the art without departing from the spirit and scope of the following claims.

I claim:

1. An interconnection network for routing data packets comprising:
   a plurality of time domain switches for routing data packets in parallel form to and from processing nodes, each of said time domain switches comprising a multiple level bus system with separate data and control paths for transmitting data packets to and from processing nodes and to and from levels in said bus system, and
   a space domain switch for routing data packets in parallel form between said time domain switches, said space domain switch comprising a plurality of individual data switching planes for routing slices of said data packets and a control plane for controlling said data switching planes, wherein said control plane comprises a plurality of inputs, a plurality of outputs, a buffer at each output corresponding to each input, and an arbiter at each output for arbitrating among said slices of data packets buffered at each output for release at said outputs.

2. The interconnection network of claim 1 wherein said control plane and said data switching planes cooperate so that control processing by said control plane and data routing by said data switching planes are overlapped.

3. The interconnection network of claim 1 wherein each of said multiple level bus systems comprises a set of local bus systems and a cluster bus system interfaced with the local bus systems.

4. The interconnection network of claim 1 wherein each of said data switching planes is an output buffered crosspoint network.

5. The interconnection network of claim 1 wherein said control plane is an output buffered crosspoint network.

6. The interconnection network of claim 1 wherein the number of switching planes is maximized based upon length of said data packets to increase parallel routing of said data packets and to reduce complexity of said space domain switch.

7. A space domain switch for routing packets comprising:
   a plurality of data switching planes, said data switching planes cooperating to route said packets through said space domain switch in parallel,
   each of said data switching planes comprising a plurality of inputs, a plurality of outputs and switching means for routing slices of packets between specific ones of said inputs of the data switching plane and specific ones of said outputs of the data switching plane, and
   a control plane for controlling said data switching planes in response to control information contained in said packets to be routed,
   wherein said control plane comprises arbitration means for arbitrating among competing requests for the outputs of said data switching planes and for broadcasting information which indicates the winning requests to the data switching planes.

8. The space domain switch of claim 7 wherein said control information is processed by said control plane and said slices are routed by said data switching planes in a time overlapped fashion.

9. A space domain switch for routing packets comprising
   a plurality of data switching planes, said data switching planes cooperating to route packets through said space domain switch in parallel,
   each of said data switching planes comprising a plurality of inputs, a plurality of outputs and switching means for routing slices of packets between specific ones of said inputs of the data switching plane and specific ones of said outputs of the data switching plane, and
   a control plane for controlling said data switching planes in response to control information contained in said packets to be routed,
   wherein each of said data switching planes comprises a buffer associated with each of the inputs at each output and a selector operable in response to the control plane for controlling access of data contained in the buffers at each output to the corresponding output.

10. The space domain switch of claim 9 wherein said control plane comprises an output buffered crosspoint network with an arbiter located at each output, each said arbiters being in communication with corresponding selectors at corresponding outputs of said data switching planes.

11. A processing system comprising
   a plurality of clusters, each of said clusters comprising a plurality of processing nodes and time domain switching means for routing data packets in parallel form to and from said processing nodes within each cluster, and
   a space domain switch for routing data packets in parallel form between clusters, said space domain switch comprising a plurality of data switching planes for routing slices of data packets from said packets and a control plane for controlling the routing of said slices by said data switching planes,
   wherein said processing nodes of each of said clusters are organized into groups and wherein the time domain switching means of each cluster comprises a set of local bus systems with separate data and control paths for transmitting packets in parallel form to and from said processing nodes within each group and a cluster bus system with separate data and control paths for transmitting data packets to and from said local bus systems.

12. A parallel processing system comprising
   a plurality of clusters, each of said clusters comprising a plurality of processing nodes and time domain switching means for routing packets in parallel form to and from the processing nodes within each cluster, and
   a space domain switch for routing data packets in parallel form between clusters, said space domain switch comprising a plurality of data switching planes for routing slices of data from said packets and a control plane for controlling the routing of said slices by said data switching planes,
   the processing nodes of each of said clusters being organized into groups, the time domain switching means of each cluster comprises a set of local bus systems with separate data and control paths for transmitting packets to and from the processing nodes within each group and a cluster bus system with separate data and control paths for transmitting packets to and from the local bus systems, and wherein each of said local bus systems comprises a first unidirectional bus for transmitting packets away from the processing nodes in a corresponding group and a second unidirectional bus for transmitting packets to the processing nodes in said corresponding group.

13. The system of claim 12 wherein said cluster bus system comprises a third unidirectional bus for transmitting packets in parallel form away from said local bus systems and to said space domain switch and a fourth unidirectional bus for transmitting packets in parallel form away from said space domain switch and to said local bus systems.

14. The system of claim 13 wherein within each cluster an interface unit connects each local bus system to the cluster bus system, each interface unit comprising first buffer means for buffering packets transmitted via the corresponding local bus system and awaiting access to the cluster bus system and second buffer means for buffering packets awaiting access to said corresponding local bus system.

15. The system of claim 12 wherein said control plane and said data switching planes are each formed by a single VLSI chip.

16. The system of claim 15 wherein said VLSI chips are arranged in three dimensions in a stack.

17. The system of claim 12 wherein each of said data switching planes comprises a plurality of inputs, a plurality of outputs, a crosspoint network, and an output port at each output,
each of said output ports comprising a buffer associated with each of said inputs for buffering data slices received from each of the inputs via the crosspoint network, and a selector responsive to arbitration information transmitted from said control plane for controlling access of the buffers to the corresponding output.

18. The system of claim 17 wherein said control plane comprises a plurality of inputs, a crosspoint network, a plurality of outputs, and an output port associated with each output.

19. The parallel processing system of claim 12 wherein the bandwidth of said time domain switching means is maximized to reduce the complexity of said space domain switch.

20. The parallel processing system of claim 12 wherein said time domain switching means and said space domain switch operate in a pipelined fashion.

21. A parallel processing system comprising
a plurality of clusters, each of said clusters comprising a plurality of processing nodes and time domain switching means for routing packets in parallel form to and from the processing nodes within each cluster, and
a space domain switch for routing data packets in parallel form between clusters, said space domain switch comprising a plurality of data switching planes for routing slices of data from said packets and a control plane for controlling the routing of said slices by said data switching planes,
the processing nodes of each of said clusters being organized into groups, the time domain switching means of each cluster comprises a set of local bus systems with separate data and control paths for transmitting packets to and from the processing nodes within each group and a cluster bus system with separate data and control paths for transmitting packets to and from the local bus systems, and wherein access to each of said local bus systems is controlled by first arbitration means.

22. The system of claim 21 wherein said first arbitration means comprises an arbiter with a tree-structure for performing variable priority arbitration among packets to be routed by one of said local bus systems.

23. The system of claim 21 wherein access to said cluster bus system is controlled by second arbitration means.

24. The system of claim 23 wherein said second arbitration means includes an arbiter with a tree structure for performing variable priority arbitrations among packets to be routed by said cluster bus.

25. A parallel processing system comprising
a plurality of clusters, each of said clusters comprising a plurality of processing nodes and time domain switching means for routing packets in parallel form to and from the processing nodes within each cluster, and
a space domain switch for routing data packets in parallel form between clusters, said space domain switch comprising a plurality of data switching planes for routing slices of data from said packets and a control plane for controlling the routing of said slices by said data switching planes,
each of said data switching planes comprising a plurality of inputs, a plurality of outputs, a crosspoint network, and an output port at each output,
each of said output ports comprising a buffer associated with each of said inputs for buffering data slices received from each of the inputs via the crosspoint network and a selector responsive to arbitration information transmitted from said control plane for controlling access of the buffers to the corresponding output,
said control plane comprising a plurality of inputs, a crosspoint network, a plurality of outputs, and an output port associated with each output, and
wherein each of said output ports of said control plane comprises a buffer for receiving requests from each of the inputs of the control plane and third arbitration means for arbitrating among the requests at each of said output ports and from broadcasting said arbitration information in the form of winning requests to said selectors at the output ports of said data switching planes.

26. The system of claim 25 wherein said third arbitration means comprise an arbitrator having a tree structure for carrying out variable priority arbitrations.

27. An interconnection network for routing data packets comprising:
a plurality of clusters, each of said clusters comprising a plurality of processing nodes and time domain switching means for routing data packets in parallel form to and from processing nodes within each cluster, wherein each of said time domain switching means comprises a multiple level bus system with separate data and control paths and wherein access to levels of said multiple level bus system is controlled by arbitration means, and
a space domain switch for routing data packets in parallel form between clusters, said space domain switch comprising a plurality of data switching planes for routing slices of data packets and a control plane for controlling the routing of said slices by said data switching planes, wherein said control plane of said space domain switch comprises a plurality of inputs, a plurality of outputs, a buffer at each output corresponding to each input, and arbitration means at each output for arbitrating among said slices of data packets buffered at each output for release at said outputs.

* * * * *